(12) United States Patent
Selén et al.

(10) Patent No.: US 9,800,353 B2
(45) Date of Patent: Oct. 24, 2017

(54) METHOD FOR CONTROLLING INTERFERENCE FROM WHITE SPACE UNITS

(75) Inventors: Yngve Selén, Uppsala (SE); Jonas Kronander, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 60 days.

(21) Appl. No.: 14/241,309

(22) PCT Filed: Nov. 8, 2011

(86) PCT No.: PCT/SE2011/051339
§ 371 (c)(1),
(2), (4) Date: Feb. 26, 2014

(87) PCT Pub. No.: WO2013/032381
PCT Pub. Date: Mar. 7, 2013

(65) Prior Publication Data
US 2014/0220901 A1    Aug. 7, 2014

Related U.S. Application Data

(60) Provisional application No. 61/529,501, filed on Aug. 31, 2011.

(51) Int. Cl.
*H04B 15/00* (2006.01)
*H04W 16/14* (2009.01)
(Continued)

(52) U.S. Cl.
CPC ........... *H04B 15/00* (2013.01); *H04B 17/391* (2015.01); *H04W 16/14* (2013.01); *H04W 52/367* (2013.01); *H04W 52/225* (2013.01)

(58) Field of Classification Search
CPC ..... H04B 17/391; H04B 15/00; H04W 16/14; H04W 52/367; H04W 52/225;
(Continued)

(56) References Cited

U.S. PATENT DOCUMENTS

2011/0287802 A1* 11/2011 Ma et al. ............... 455/517
2013/0343219 A1* 12/2013 Kronander .......... H04W 52/243
370/252

OTHER PUBLICATIONS

International Search Report for International Application No. PCT/SE2011/051339, Mar. 1, 2012.
(Continued)

*Primary Examiner* — Ping Hsieh
*Assistant Examiner* — James Yang
(74) *Attorney, Agent, or Firm* — Baker Botts, LLP

(57) ABSTRACT

A method for controlling an aggregated interference generated by at least two white space units in at least one point in space for at least one frequency channel is provided. A model of propagation channels from each of the white space units to each of the at least one point includes a variable with a lognormal distribution. The method comprises receiving requests for usage of white space frequency channels from the white space units. The requests include positions of the white space units. Output power limits are determined for the white space units by maximizing a utility function while fulfilling a probabilistic constraint on the amount of aggregated interference generated in each of the at least one point. A sum of lognormal variables in the probabilistic constraint is approximated by a single lognormal variable. The determined output power limits are then transmitted to the respective white space units.

22 Claims, 9 Drawing Sheets

(51) Int. Cl.
*H04W 52/36* (2009.01)
*H04B 17/391* (2015.01)
*H04W 52/22* (2009.01)

(58) Field of Classification Search
CPC . H04W 88/08; H04W 72/042; H04W 28/065; H04W 72/0413; H04L 5/0066
See application file for complete search history.

(56) References Cited

OTHER PUBLICATIONS

"Approximation for a Sum of On-Off Lognormal Processes with Wireless Applications" by C. Fischione et al., Oct. 2007.
"Monitoring-Based Spectrum Management for Expanding Opportunities of White Space Utilization" by Muraoka et al., 2011.
"Adjacent Channel Operation of Portable Unlicensed Devices Inside DTV Service Contours" by Dahama et al., 2010.
"Joint Rate and Power Allovation for Cognitive Radios in Dynamic Spectrum Access Environment" by Kim et al., 2008.
"Statistical Power Sum Analysis for Nonidentically Distributed Correlated Lognormal Signals" by Pekka Pirinen; Telecommuncations Laboratory and Centre for Wireless Communications; University of Oulu, Finland.

\* cited by examiner

METHOD FOR CONTROLLING INTERFERENCE FROM WHITE SPACE UNITS

PRIORITY

This nonprovisional application is a U.S. National Stage Filing under 35 U.S.C. §371 of International Patent Application Serial No. PCT/SE2011/051339, filed Nov. 8, 2011 and entitled "Method for Controlling Interference from White Space Units," which claims the benefit of U.S. Provisional Application No. 61/529,501, filed Aug. 31, 2011 and entitled "Method for Controlling Interference from White Space Units."

TECHNICAL FIELD

The disclosure relates to the field of determining output power limits for white space devices. More particularly, the disclosure relates to a node, and a method in the node for controlling an aggregated interference generated by at least two white space units in at least one point in space for at least one frequency channel.

BACKGROUND

Spectrum scarcity is a problem that has been observed in regulative frequency allocation charts for some time. All potentially interesting spectrum bands for mobile communication are already allocated to services. However, additional spectrum for mobile broadband is needed to cope with the exponential take-off of mobile broadband traffic. At the same time traditional spectrum regulatory methods are sometimes perceived as too slow to adapt to the sometimes rapidly changing economic and technical requirements, implying that large parts of the electromagnetic spectrum is licensed but not effectively used.

In particular, the TV broadcast spectrum is not efficiently used due to the way the TV broadcast networks have been deployed. They are based on the concept of high transmit towers with high transmit power serving large areas with digital or analog TV. This type of deployment makes the frequency reuse distance large—in the order of 100 km—implying a spatially sparse use of the frequency band. The geographical areas where a TV frequency channel is not in use have been termed TV white space for that channel.

Motivated by the underutilization of e.g. the TV broadcast bands, the research community has during the last decade performed research into so called secondary spectrum access. The goal of secondary spectrum access is to use licensed but unused parts of the spectrum, e.g. the TV broadcast bands, for communication in such a way that a primary user, i.e., the user of the service provided by the license holder or the one having prioritized right to use the spectrum, is not negatively affected by the transmissions in the secondary system.

The central idea behind secondary spectrum access by secondary systems is thus to use already licensed or allocated spectrum for secondary purposes, i.e., for communication between a secondary transmitter and a secondary receiver or two secondary transceivers. As an example, the TV white spaces in the TV broadcast spectrum could be used for secondary purposes. Secondary users in a secondary system may also be referred to as a white space devices (WSD) in a white space system, which are thus units that opportunistically use spectrum licensed or dedicated for a primary service on a secondary basis at times or locations where a primary user is not using the spectrum. As already mentioned above, the WSD or white space systems are not allowed to cause harmful interference to the primary service. Furthermore, the WSD and white space systems are not protected from interference from any primary service or user.

Recently, the United States (US) regulatory body Federal Communications Commission (FCC) has opened up the opportunity for secondary usage of the TV broadcast band in the US under a set of conditions. Furthermore, the regulator authority Ofcom is well on the progress of finalizing a rule set that allows secondary usage of the TV broadcast bands in the United Kingdom (UK). In Europe, the regulatory standardization group European Conference of Postal and Telecommunications Administrations (CEPT) SE43 has lately finalized a report outlining the requirements for operating as a secondary user in the TV white spaces. Thus, the process of opening up TV white spaces for secondary usage around the globe is well under way.

One commonality to the rules in place in the US and the proposed rules in Europe and UK is that one allowed way of discovering spectrum opportunities for secondary usage to get access to the TV white spaces, i.e., perform secondary transmissions in the TV bands, is to access a centrally managed database referred to as a geo-location database. Upon a query from a secondary user or a WSD, the geo-location database provides the WSD with a list of TV channels available for secondary usage, also called TV white space channels, at the location of the WSD. The WSD may provide information regarding its location and possibly also additional information in the database query. Furthermore, in the CEPT SE43 proposal, the WSD obtains maximum allowed transmit power levels associated with the channels available for secondary usage in the response from the database. These transmit power levels are based on an estimation of how much interference that would be generated in a worst case, including a margin to take into account the aggregated interference from multiple WSDs using the same white space spectrum.

The control of the aggregated interference towards a certain point, line, area or volume is an important problem since regulators enforce limits on the interference a system is allowed to cause to other systems. Particularly for secondary usage of spectrum, e.g., TV broadcast bands, it is of vital importance to assure that the interference caused by multiple secondary users or systems to a primary user does not exceed a threshold of harmful interference, or at least exceeds the threshold only with a low enough probability.

Setting an arbitrary margin to take aggregated interference from multiple WSDs into account is not the most efficient way of using the white space spectrum. A fixed margin cannot account for the different types of interference which is caused from different numbers of secondary users with different fading situations. There is a risk of choosing a margin value which is either overprotective, which would mean that the WSDs are not allowed to use spectrum which could actually be used, or which does not protect enough, which would mean that the WSDs would cause harmful interference in many cases.

SUMMARY

An object is therefore to address some of the problems and disadvantages outlined above, and to determine WSD output power limits without having to assume a worst case scenario and a fixed margin to account for interference from multiple WSDs, as this solution results in a sub-optimal output power limit allocation for the WSDs. This may be achieved by formulating an optimization problem that may be efficiently solved to determine the output power limits. The optimization problem should be based on a maximizing of a sum-capacity or some other value measuring the utility of the secondary users, subject to constraints on allowed output power of the secondary users and a probabilistic constraint on the amount of aggregated interference they are allowed to cause to a primary user.

In accordance with a first aspect of embodiments, a method of a node, for controlling an aggregated interference generated by at least two white space units in at least one point in space for at least one frequency channel is provided. A model of propagation channels from each of the at least two white space units to each of the at least one point comprises a variable with a lognormal distribution. The method comprises receiving requests for usage of white space frequency channels from the at least two white space units, the requests comprising positions of the at least two white space units. The method also comprises determining output power limits for the at least two white space units by maximizing a utility function while fulfilling a probabilistic constraint on the amount of aggregated interference generated in each of the at least one point, based on the received requests and on said model of propagation channels. A sum of lognormal variables in the probabilistic constraint is approximated by a single lognormal variable. The method further comprises transmitting the determined output power limits to the respective at least two white space units.

In accordance with a second aspect of embodiments, a node configured to control an aggregated interference generated by at least two white space units in at least one point in space for at least one frequency channel is provided. A model of propagation channels from each of the at least two white space units to each of the at least one point comprises a variable with a lognormal distribution. The node comprises a communication unit and a processing unit. The communication unit is configured to receive requests for usage of white space frequency channels from the at least two white space units, the requests comprising positions of the at least two white space units. The processing unit is configured to determine output power limits for the at least two white space units by maximizing a utility function while fulfilling a probabilistic constraint on the amount of aggregated interference generated in each of the at least one point, based on the received requests and on said model of propagation channels. A sum of lognormal variables in the probabilistic constraint is approximated by a single lognormal variable. The communication unit is further configured to transmit the determined output power limits to the respective at least two white space units.

An advantage of embodiments is that the output power limits of the WSDs are adapted to the actual situation and the determining of the output power limits does not rely on a fixed margin to take aggregated interference into account. This allows for better and more efficient white space utilization. Furthermore, the approximation used to simplify the optimization problem offers good performance in terms of speed and precision.

Other objects, advantages and novel features of embodiments will be explained in the following detailed description when considered in conjunction with the accompanying drawings and claims.

DETAILED DESCRIPTION

Figure 1:
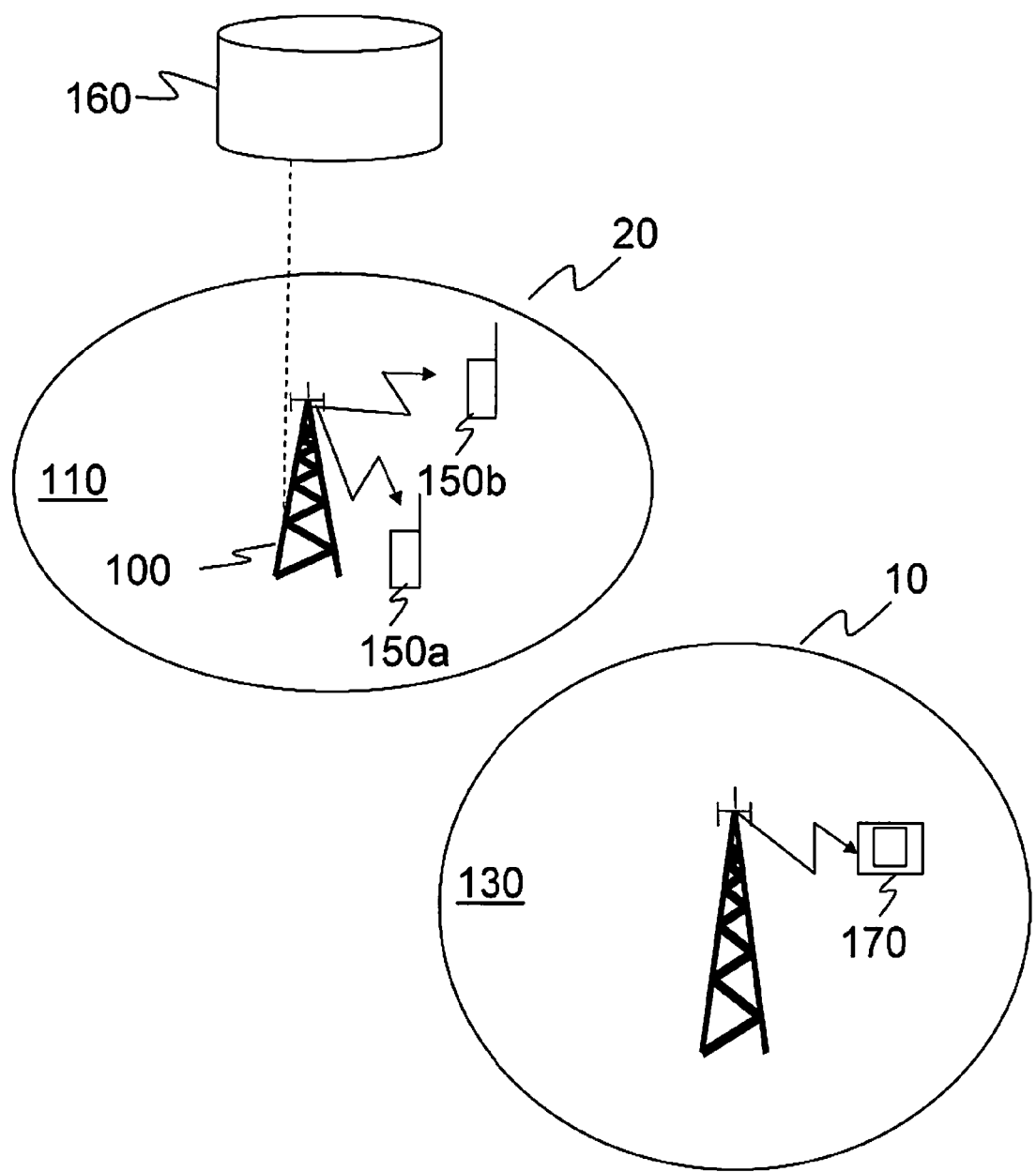
FIG. 1 is a block diagram illustrating a primary and a secondary system according to prior art.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that while the embodiments are primarily described in form of a method and a device, they may also be embodied in a computer program product as well as in a system comprising a computer processor and a memory coupled to the processor, wherein the memory is encoded with one or more programs that may perform the method steps disclosed herein.

This disclosure describes a method and apparatus to calculate and limit, i.e. to control, the level of aggregated interference which is caused to a point, line, area, or volume which should be protected. The method is typically run at a central entity or node, e.g., a server controlled by a white space database operator, to which WSDs send their requests for using spectrum. The previously described geo-location database is one example of such a central entity. The entity executing the method replies to the requests from the WSDs, and provides upper output power limits that may be used by the WSDs. These limits are typically valid for a limited amount of time, after which a new optimization may be made.

The technology applies both to the case when WSDs operate on a single radio channel as well as to the case when the WSDs operate on several channels. Further it applies to the case where the primary receivers which need to be protected may be present on only one or on several frequency channels, i.e., a constraint on the aggregated interference is present for one or many channels. Furthermore, WSD transmission leakage into neighboring channels is also handled.

The disclosure comprises a formulation of an optimization problem for optimizing a desired quantity, e.g., sum-capacity of the secondary users subject to constraints on allowed output power of the secondary users and a probabilistic constraint on the amount of aggregated interference they are allowed to cause to a primary user. The probabilistic constraint is infeasible to directly take into account in a numerical solver so it may be replaced by a highly computationally efficient approximation which also gives good performance. This allows efficient solving of the optimization problem, the solution of which thereafter may be checked by means of a Monte Carlo (MC) simulation. If the solution of the optimization problem is good enough compared to the MC simulation it is accepted. If not good enough, the output of the optimization problem may be used as a starting point for a further possibly more complex optimization, or the solution may be given some simple modification. A numerical evaluation of the proposed method is given below to prove that it works well.

The disclosure may be summarized as follows:

The problem of finding the output power limits for WSDs is described as a mathematical optimization problem. It is recognized that a direct solution of the problem is computationally infeasible due to a complicated constraint. Therefore, the complicated constraint may be replaced by an approximation, resulting in a simplified problem. An efficient approximation which further offers good performance is found in the form of the Fenton-Wilkinson (FW) approximation, which is one alternative embodiment. It is also recognized that the solution of the simplified problem, while it turns out to most likely fulfill the initial constraints, may optionally be checked by means of a MC simulation. A variety of options for the optimization problem is identified and described, e.g., in the form of additional constraints, and in the form of additions to consider interference on neighboring channels. Furthermore, it is described what entities that communicate, what kind of information is transferred between them, and at what type of entity the simplified optimization problem is solved.

Embodiments are described herein by way of reference to particular example scenarios. Particular aspects are described in a non-limiting general context in relation to a primary TV broadcast system and TV white space usage. It should though be noted that the embodiments may also be applied to other types of primary systems such as evolved LTE, Universal Mobile Telecommunications System (UMTS), cdma2000, WiFi, distance measuring equipment for aeronautical navigation purposes and radar systems.

A non-limiting example scenario is illustrated in FIG. 1, where the secondary system or white space system 20 is an e-UTRAN, comprising of evolved Node Bs (eNB) 100 with a service coverage area 110. The UEs 150a-b are the WSDs within the service coverage area 110 controlled or served by the eNBs. The eNB 100 is connected to the geo-location database 160, typically via the Internet. The primary system 10 is in this example scenario a TV broadcast system providing a TV broadcast service to the primary TV receivers 170 in a certain service area 130. However, in an alternative exemplary embodiment the secondary system may be any other type of wireless communication system supporting white space usage. Similarly, also the primary system may be any other type of system, including radar systems and aeronautical navigation systems.

The problem to be solved by the present disclosure is that of finding upper power limits for radio transmitters for which the aggregated interference they cause to a point, line segment or area must be constrained. One example of a use case is that of secondary transmitter operating near a Digital TV (DTV) service area. The system controlling the output power of these secondary transmitters must be able to guarantee, with a sufficiently high probability, that the aggregated interference these secondary transmitters cause to the DTV service area is below a certain threshold; i.e., such that the risk of harmfully affecting a DTV receiver is low. For a single transmitter e.g., a secondary transmitter, the upper power limit may typically be computed according to the following:

$$\bar{p} = \mathrm{argmax}\, p \quad (1)$$

subject to the constraints $\Pr\{pG \geq \tau\} \leq \epsilon$, and $p \geq 0$. $\tau$ is a critical interference value of a primary receiver, i.e., a value that must not be exceeded, and $\epsilon$ is the acceptable—typically low—probability that $\tau$ is exceeded. The function Pr is used to denote "the probability of". Here, p is the power level of the transmitter and G describes the path gain including antenna gains and other effects. It will be assumed herein, and it is often the case, that G is modeled as a lognormal random variable due to the typical lognormal fading model.

Figure 2:
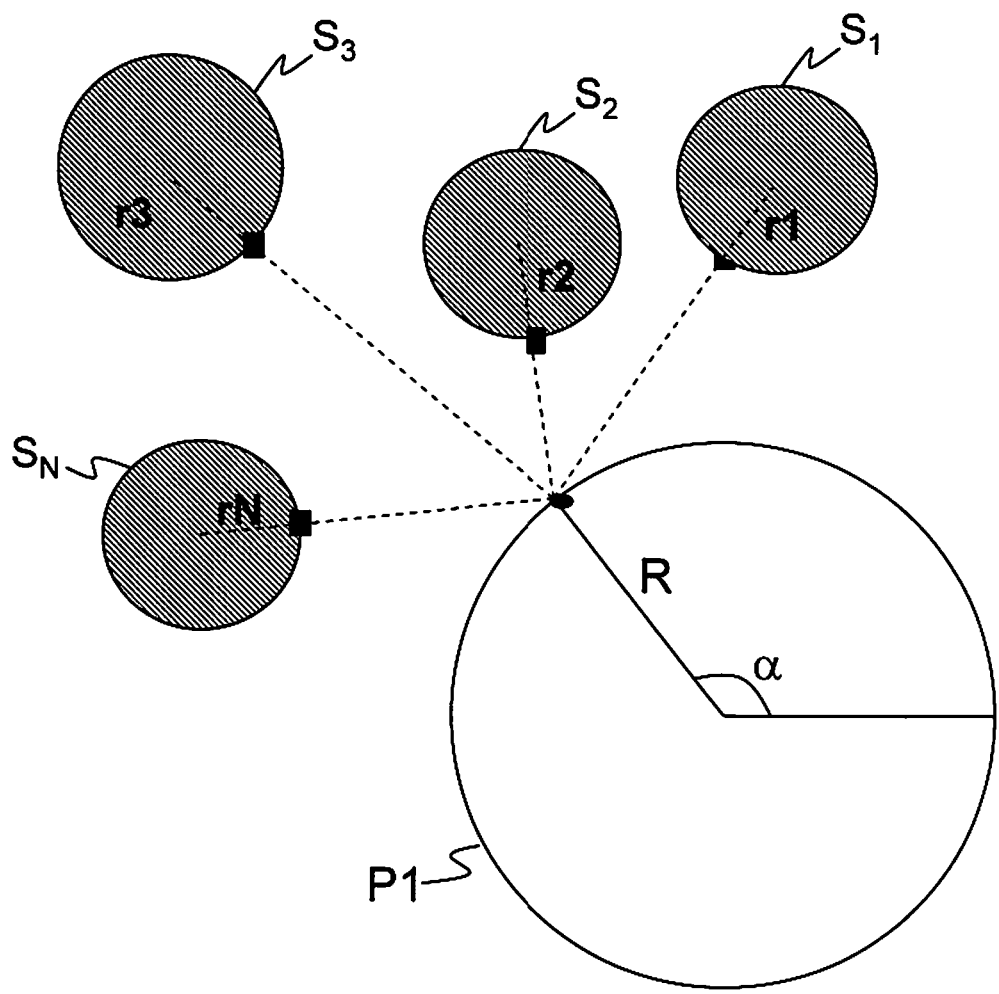
FIG. 2 illustrates schematically worst case position assumptions for secondary systems.

From here on the example of secondary transmitters causing aggregated interference to a primary system will be used in the description. The term white space device (WSD) will also interchangeably be used for the term secondary transmitter. It should be realized that this is but one application area for the problem and solution at hand. Also, in this text no technical difference will be made between interference caused from secondary systems and from individual secondary transmitters. Typically, the worst case position assumption for a secondary system, which is a single transmitter as close as possible to the protected region or a receiver of the primary system, would be assumed. FIG. 2 shows an example of a relevant scenario for the current technology. The secondary service areas are the striped circles $S_1$, $S_2$, $S_3$, $S_N$. A point at the edge of the circular service area of the protected primary system P1 corresponding to an angle $\alpha$ is illustrated with a dot and the worst case secondary transmitter locations are illustrated as squares. The primary service area P1 has a radius denoted R. The N secondary systems have corresponding radii of service areas $S_1$-$S_N$ denoted r1-rN.

For the case of multiple secondary transmitters or systems the problem becomes more complicated than in equation (1) above. There are now multiple power limits to decide and the transmitters compete for the total aggregated interference they are allowed to cause in the sense that if the power limit for one secondary transmitter or system is lowered, another transmitter or system may be able to increase its power limit. Assuming N secondary transmitters or systems the upper power limit may be computed according to the following:

$$\bar{p} = \mathrm{argmax}_p f(p) \quad (2)$$

subject to the following constraints:

$$[\max_\alpha \Pr\{p^T G(\alpha) \geq \tau\}] \leq \epsilon \quad (3)$$

$$p_i \geq 0, i=1,\ldots,N \quad (4)$$

$$p_i \leq p_i^{max}, i=1,\ldots,N \quad (5)$$

Further constraints than the ones mentioned in (3)-(5) may be added. An advantage of embodiments is that there is a flexibility with regards to the choice of constraints on the power limits that may be added to the probabilistic constraint in (3).

The function $f(p)$ is the quantity or utility function to maximize, e.g., a sum-capacity or some other relevant measure. Some examples of measures to maximize are given hereinafter. $p=[p_1\, p_2\, \ldots\, p_N]^T$ is the power vector and $\bar{p}$ is the optimal power limit allocation.

$G(\alpha)=[G_1(\alpha)\, G_2(\alpha)\, \ldots\, G_N(\alpha)]^T$ is the gain vector including pathloss, antenna gains, and other effects, and the variable $\alpha$ is used to denote that the aggregate interference constraint must be fulfilled at one or multiple points, a line, an area or a volume. α, which may be a vector or a scalar, spans all these possibilities in this expression. An example, illustrated in FIG. 2, in which α denotes an angle which uniquely describes a point on a circular protection contour will be considered, e.g., for a primary DTV system. The first constraint (3) for equation (2) hence guarantees that there is no point on the protection contour that has a greater probability than ε of having an aggregate interference from the N transmitters which exceeds the value τ. The second (4) and third (5) constraints for equation (2) constrain the output power of an individual secondary transmitter to be within feasible levels. The maximum output power value $p_i^{max}$ may, e.g., be defined from the capabilities of the secondary transmitter, or from regulatory requirements. Alternatively the WSD may simply have no use of a higher power level than this maximum output power value, and therefore transmits this information to the entity performing the optimization.

As already mentioned, $G_i$ is typically lognormally distributed, i.e., $$G_i \sim LN(m_{Gi}, \sigma_{Gi}^2), \text{ or } G_{i,dB} \sim N(m_{Gi,dB}, \sigma_{Gi,dB}^2). \quad (6)$$

$m_{Gi,dB}$ is the mean and $\sigma_{Gi,dB}^2$ is the variance of the normal distribution of $G_{i,dB}$. The parameters without dB in the subscript denote the corresponding quantities in a linear scale, where $m_{Gi}$ denotes the median value of the lognormal distribution. The further constraints which may be added with equation (2) could, e.g., relate to fairness. A power fairness constraint may e.g. be given by $p = p_{eq}[1\ 1\ \ldots\ 1]^T$ where $p_{eq}$ is the power level equal for all transmitters. Fairness may also be incorporated in the shape of the function $f(p)$, where the function could increase considerably when WSDs with a current low capacity increase their power levels, and increase less when WSDs with already high capacity further increase their power levels.

The so called objective function or utility function $f(p)$ defines the quantity to optimize, which in the examples given here are quantities to maximize. A natural function to maximize would be, e.g., the sum-capacity of the WSDs or secondary systems. In that case:

$$f(p) = B \sum_{i=1}^{N} \log_2\left(1 + \frac{p_i g_i}{n_i}\right) \quad (7)$$

where B is the bandwidth used by the secondary system, or the channel bandwidth assuming that all secondary systems wish to use this bandwidth. The equation may be generalized to different bandwidths for different systems. $g_i$ is the intra-system gain, i.e., within the secondary system i. $G_i$, on the other hand, denotes the inter-system gain from a secondary transmitter i to a primary system. $n_i$ is the noise plus interference level for secondary system i. The interference from one or more primary systems may be taken into account such that $n_i$ is reduced when the distance from the primary service areas increases. The interference from the other WSDs or secondary systems may also be included in $n_i$. A possible formulation of $n_i$ would then be:

$$n_i = n_{Floor,i} + g_{iP} p_P + \sum_{j=1, j \neq i}^{N} \beta_j g_{ij} p_j \quad (8)$$

where $n_{Floor,i}$ is the residual noise floor at WSD i, $g_{iP}$ is the channel gain, including antenna gain and other effects, between the primary transmitter which has a transmit power of $p_P$ and the WSD. If there are multiple primary transmitters it is a sum of such channel gains. $g_{ij}$ is the gain between the WSDs or systems i and j, and $\beta_j \leq 1$ is a weighting factor which could represent a probability that WSD j is transmitting. If such a probability is low then the effect on $n_i$ should also be low.

An alternative to maximizing the sum-capacity according to equation (7) is to maximize the secondary sum-power:

$$f(p) = \sum_{i=1}^{N} p_i. \quad (9)$$

A further alternative is to maximize the total WSD throughput, provided appropriate models are available. E.g., if the throughput model for the ith WSD may be described as $f_i(p)$, where the function $f_i(p)$ returns the bits per second, then the function to maximize becomes:

$$f(p) = \sum_{i=1}^{N} f_i(p). \quad (10)$$

An advantage of embodiments is thus that there is a flexibility with regards to the choice of objective function to optimize.

The Approximation

The probabilistic interference constraint in (3) is not straightforward to solve. Particularly, when the components of G(α) have a lognormal distribution the weighted sum of these components has a distribution for which no known expression exists. In this subsection an efficient approximation is derived.

There exist several numerical approximations where the sum of lognormally distributed variables is approximated with another lognormal variable. Herein, one of these are proposed to be used, namely the Fenton-Wilkinson (FW) approximation. The reasons for choosing the FW approximations are twofold:

(a) It is easily obtainable in closed form which makes it suitable for numerical optimization; and (b) It is known to offer a good approximation for the right tail of the lognormal distribution (i.e., large values, compared to the medium or median of the distribution) which is highly relevant for the problem at hand, since ε in (3) typically has a low value.

With the FW approximation, the total interference component from (3) is rewritten in exponential form:

$$I_{tot}(\alpha, p) = \sum_{i=1}^{N} \frac{p_i G_i(\alpha)}{I_i(\alpha, p)} \quad (11)$$

$$= \sum_{i=1}^{N} e^{Y_i(\alpha, p)}$$

$$\approx e^{Z(\alpha, p)}$$

where $Y_i \sim N(m_{yi}, \sigma_{yi}^2)$, $Z \sim N(m_z, \sigma_z^2)$ with $$m_z = 2 \ln u_1 - \frac{1}{2} \ln u_2$$

$$\sigma_z^2 = \ln u_2 - 2 \ln u_1.$$

Furthermore, $$u_1 = \sum_{i=1}^{N} e^{m_{y_i} + \sigma_{y_i}^2/2}$$

$$u_2 = \sum_{i=1}^{N} e^{2m_{y_i} + 2\sigma_{y_i}^2} + 2 \sum_{i=1}^{N-1} \sum_{j=i+1}^{N} e^{m_{y_i} + m_{y_j}} \rho_{i,j}$$

with $$\rho_{i,j} = e^{\frac{1}{2}(\sigma_{y_i}^2 + \sigma_{y_j}^2 + 2r_{ij}\sigma_{y_i}\sigma_{y_j})}$$

where $r_{ij}$ denotes the correlation coefficient between the fading on the signal from WSD i and j:

$$r_{ij} = \frac{E\{(Y_i - m_{y_i})(Y_j - m_{y_j})\}}{\sigma_{y_i}\sigma_{y_j}}.$$

By expressing $l_i(\alpha,p)$ in dB scale, i.e. $l_{i,dB}(\alpha,p)=10 \log_{10} p_i + 10 \log_{10} G_i(\alpha)$ the following is obtained:

$$Y_i \sim \mathcal{N}\left(\underbrace{\ln p_i + \frac{\ln 10}{10} m_{G_i,dB}(\alpha)}_{m_{y_i}}, \underbrace{\left(\frac{\ln 10}{10}\right)^2 \sigma_{G_i,dB}^3}_{\sigma_{y_i}^2}\right).$$

By using the above expressions the distribution of Z which approximates the log-sum in (11) is defined and may be used to efficiently approximate the probability constraint in (3).

Solving the Optimization Problem

With the above approximations and disregarding any additional constraints to equation (2), the modified optimization problem becomes $$\bar{p} = \operatorname{argmax}_p f(p,g,n) \quad (12)$$

subject to the following constraints:

$$[\max_\alpha Pr\{e^{Z(\alpha,p)} \geq \tau\}] \leq \epsilon \quad (13)$$

$$p_i \geq 0, i=1, \ldots, N \quad (14)$$

$$p_i \leq p_i^{max}, i=1, \ldots, N \quad (15)$$

Further constraints than the ones mentioned in (13)-(15) may be added. The objective function or utility function may be the sum capacity which is expressed as:

$$f(p,g,n) = \sum_{i=1}^{N} B \log_2 [1 + 10^{(p_{i,dBm} + g_{i,dB} - n_{i,dBm})/10}]$$

when the involved quantities are expressed in dB scale (see (7)).

In many situations it is not straightforward to know what value of a that should be used for the probability constraint, i.e., for which $\alpha$ the probability of harmful interference is the largest. In such situations, and potentially also for a stability of the numerical solver of (12) subject to the constraints in (13)-(15), the constraint may be solved for a fine enough grid of $\alpha$, $\{\alpha_j\}$, j=1, ..., J effectively replacing the probabilistic constraint in (13) by the analytically equivalent:

$$Pr\{e^{Z(\alpha_j,p)} \geq \tau\} \leq \epsilon, j=1, \ldots, J.$$

For numerical reasons it is advantageous to operate in the dB domain. The numerical solver of (12) can also benefit from knowledge of the gradients of the function $f(p)$ and of the probability constraint with respect to the power vector in dBm. These are rather straightforward although tedious to compute and are described in a paragraph hereinafter. The following parameters are expected to be supplied to the method by the user: $m_{Gi,dB}$, $\sigma_{Gi,dB}^2$, $r_{ij}$, $\epsilon$, $\tau$, $g_{i,dB}$, $n_{i,dBm}$. The inter-WSD parameters $g_{i,dB}$, $n_{i,dBm}$ are not necessarily known, unless supplied by the WSD. If they are not known typical values can be used instead.

Once the modified optimization problem in (12) subject to constraints (13)-(15) has been solved with a numerical solver, MC simulations may be used to assert that the probability constraint is fulfilled. If the constraint is violated or if the solution is not tight enough the solution can be used as a starting value for further possibly more complex numerical optimization, or the power limits from the solution can be given some simple modification. As an example, the output power limits may increase (if the constraint (13) is fulfilled with a "too high" margin) or decrease (if the constraint (13) is not fulfilled) in the direction of the constraint gradient until the constraint fulfillment is satisfactory. In this manner output power limits for secondary units subject to a probabilistic constraint on the aggregate interference are obtained.

Alternatively, the optimization can be rerun with a lower value of $\epsilon$ or $\tau$, or initially a lower value than what the regulators require for $\epsilon$ or $\tau$ may be used to further decrease the probability that harmful interference is caused.

Extension to Multiple Channels

The problems in (2)-(5), and in (12)-(15) make it possible to control the interference from white space units on a single channel only. However, WSD transmitters operating on one channel will typically leak power into neighboring channels, and primary users operating on neighboring channels will typically have imperfect receivers which also receive power on other channels than the operating channel. To this end it may be valuable to control also the aggregate interference on other channels.

It is straightforward to extend the problems in (2)-(5), and in (12)-(15) to take other channels into account. All that needs to be done is to extend the gain vector $G(\alpha)$ to a gain matrix $\bar{G}(\alpha)$ where each column represents the gain on a separate channel, also taking the adjacent channel suppression into account. For neighboring channels, this would typically include pathloss, antenna gains, and adjacent channel suppression from the WSD transmitter. The extended problem in (2)-(5) would look like:

$$\bar{p} = \operatorname{argmax}_p f(p)$$

subject to the following constraints:

$$[\max_\alpha Pr\{p^T \bar{G}(\alpha) \geq \tau\}] \leq \epsilon$$

$$p_i \geq 0, i=1, \ldots, N$$

$$p_i \leq p_i^{max}, i=1, \ldots, N$$

where $\tau$ now is a row vector. Further constraints than the ones mentioned here may be added. The probabilistic constraint may be efficiently approximated using the FW approximation as described above. In this formulation of the optimization problem the channels that the WSDs or white space systems use are fixed, although they need not all use the same channel. A change of channels would be modeled as a change in $\bar{G}(\alpha)$ which is fixed in the optimization. It should be noted that depending on the areas to be protected on the other channels, $\alpha$ may potentially no longer be interpreted as an angle describing a point on a protection contour. Checking the constraint along a protection contour may no longer be sufficient, as it may be so that a larger area needs to be protected, or that different areas needs to be protected for each channel, one for each considered channel. α will then typically carry an index corresponding to the area or contour that needs to be protected for the channel indicated by the index.

Extension to Include Channel Selection

Yet another possible extension of the problem and its efficient approximation taking several channels into account is to allow the secondary transmitters to transmit on different and possibly multiple channels. We will denote this "channel selection", meaning that a channel is selected if a WSD transmits on it with a non-zero power. M indicates the number of channels and N indicates the number of WSDs considered. By letting $p_{ij}$ denote the power of the ith WSD's transmission on channel j and letting $\tilde{G}_{ijk}(\alpha)$ denote the gain on channel k for the ith WSD's transmission on channel j to the position described by α, the following is obtained:

$$\bar{p} = \text{argmax}_p f(p)$$

subject to the following constraints:

$$\left[\max_\alpha Pr\left\{\sum_{i=1}^{N}\sum_{j=1}^{M} p_{ij}\tilde{G}_{ijk}(\alpha) \geq \tau_k\right\}\right] \leq \varepsilon_k$$

$$k = 1, \ldots, M$$

$$p_{ij} \geq 0, i = 1, \ldots, N, j = 1, \ldots, M$$

$$p_{ij} \leq p_{ij}^{max}, i = 1, \ldots, N, j = 1, \ldots, M$$

Further constraints than the ones mentioned here may be added. When j≠k the gain $\tilde{G}_{ijk}(\alpha)$ according to the above also covers leakage onto another channel. Here $\epsilon_k$ is the acceptable probability of interference for channel k. The probabilities may be different for different channels. Typically additional constraints related to the capabilities of the WSDs need to be added. E.g., the ith WSD may only be able to transmit on L channels simultaneously and this would be reflected by adding the constraint $$\sum_{j=1}^{M} S(p_{ij}) \leq L$$

where S(a) is a step function which is 0 if a≤0 and 1 otherwise. Yet another constraint is to require that each WSD has an upper limit on its total transmit power, i.e., summed over all channels, $$\sum_{j=1}^{M} p_{ij} \leq P_i^{tot,max},$$

$$i = 1, \ldots, N.$$

The upper limit may be individual, i.e. WSD specific, and may be dependent on the WSD hardware. Then this constraint may, but does not necessarily, replace the constraint that $p_{ij} \leq P_{ij}^{max}$, i=1, . . . , N, j=1, . . . M. Other constraints for which the mathematical formulations are straightforward to derive are constraints which require that the secondary transmitter use contiguous channels.

An advantage of the above mentioned embodiments is thus that multiple channels may be considered, both when it comes to studying interference to other frequency channels and when it comes to selecting the appropriate frequency channels for the WSDs. Interference to other channels can be an important parameter when deciding the white space channel availability.

Other Extensions

Some of the WSDs may require a minimum power limit in order to want to use the spectrum. I.e., they may want to have a power of at least $p_{i,min}$, and if they cannot get at least that output power they may equally use zero power. This may either be handled by introducing a constraint directly in the above optimization problem, i.e., replacing the constraint $p_i \geq 0$ by:

$$p_i \geq p_{i,min} \text{ or } p_i = 0.$$

Alternatively, and perhaps more efficiently, it may be handled in the following manner:

1. The optimization problem is solved with the normal $p_i \geq 0$ constraint.
2. If all WSDs get at least their minimum power, then a solution has been found and the following steps are not needed.
3. If at least one WSD has obtained a power limit below its $p_{i,min}$, then remove at least one of these at least one WSDs from the optimization problem and go back to 1. The WSD(s) which is/are removed, i.e., which will not be allowed to use the spectrum for some time, may be arbitrarily selected, or the selection may be based on other factors such as earlier spectrum usage, device or service type, relation to the entity allocating the power limits, or the value of $p_{i,min}$. A WSD which used the spectrum extensively previously may have to cease its transmissions for a while, or a WSD that is not of a certain type, or does not belong to a preferred customer may be the first to be removed. In the case that no WSDs remain after WSD removal, then the requirements of the WSDs are too high and no secondary spectrum usage is allowed.

Execution of the Method

The method described in the previous sections would typically be executed by a white space database operator (WSDO), e.g., a white space database operator which is responsible for controlling the operation of secondary transmitters in the spectrum such as a geo-location database operator. It should be realized that a WSDO could also be a single base station controlling aggregate interference from multiple UEs that it controls, or a node in a cellular system that controls the aggregate interference from multiple cells, or an inter cellular system node that controls the aggregate interference from multiple cells of multiple cellular systems, or a unit which controls the aggregate interference from multiple transmitters of various sorts that access the white space.

The method would typically execute as follows:
1. WSDs report their interest in using spectrum to the WSDO, by sending a request for usage of the spectrum. They additionally report information to the WSDO such as WSD positions and output power limitations, e.g. together with the request. This information may be used in the optimization in the next step.
2. The WSDO uses the input from the WSDs to compute the quantities used in the optimization problem, as described above. E.g., the gain vectors G(α) or the gain matrices $\bar{G}(\alpha)$, are computed using appropriate propagation models and the WSD position information. Once all relevant quantities are decided, the WSDO solves the optimization problem as described above in e.g. equation (12) with constraints in (13)-(15) to obtain the WSDs' output power limits.

3. The WSDO informs the WSDs of their respective output power limits which are the solution to the optimization in step 2. These output power limits may be valid for some defined period of time. When this period expires, the WSDs which are interested in using the spectrum for a next period of time may repeat the procedure starting in step 1. Alternatively, the period of time for which the determined output power limits are valid is not a fixed time period, but may be adapted dependent on the mobility of the WSDs and dependent on if any new WSDs request to use the spectrum.

Numerical Validation

In this section it is shown that the approximated optimization problem in (12) subject to the constraints in (13)-(15) solves well and provides good approximate solutions to the initial optimization problem in (2) subject to the constraints in (3)-(5). The validation is made for a single channel. Other simulations with other parameter settings have been run with similarly good results.

Figure 3:
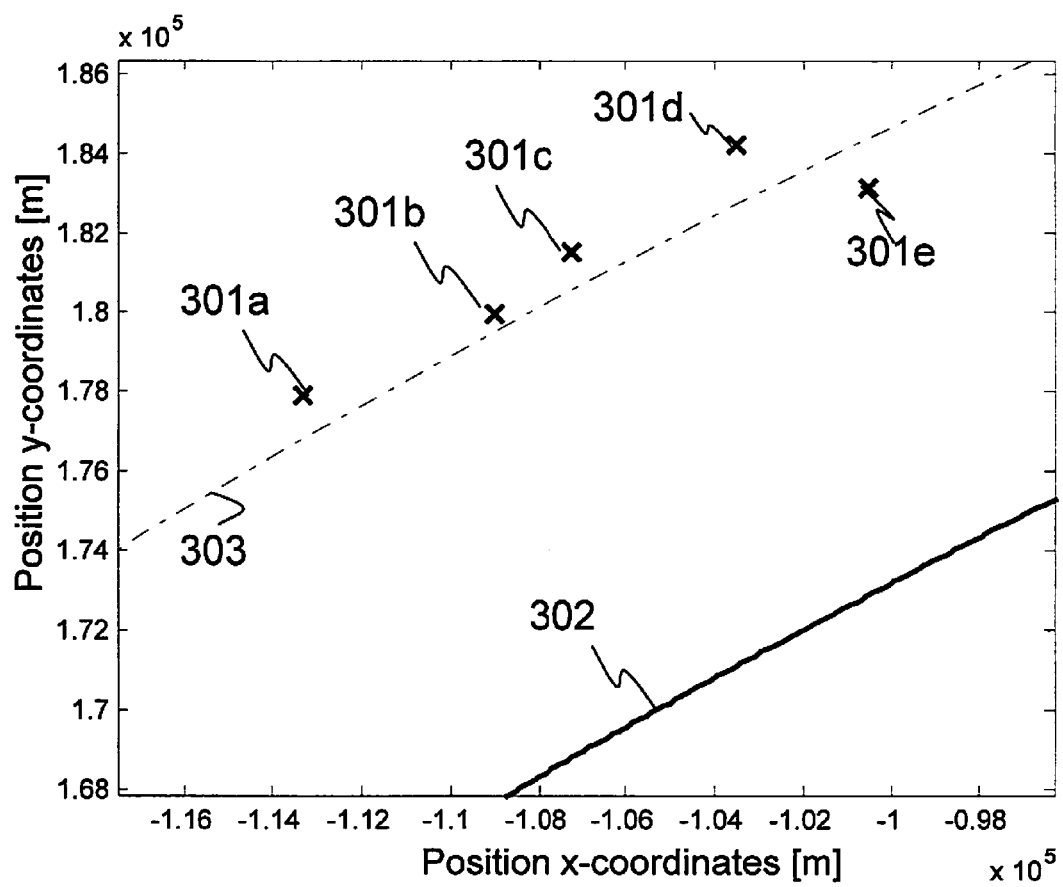
FIG. 3 is a diagram schematically illustrating an example realization with five WSDs outside the protection contour of a DTV system.

The method is validated for an example in which five WSDs 301 are given random positions outside the protection contour 302 of a DTV system. For the probability constraint the variables $\tau=-100$ dBm and $\epsilon=0.5\%$ are used. An example realization of their positions is given in FIG. 3. The dotted line 303 indicates an average distance from the protection contour of the randomly generated WSD positions.

Figure 4:
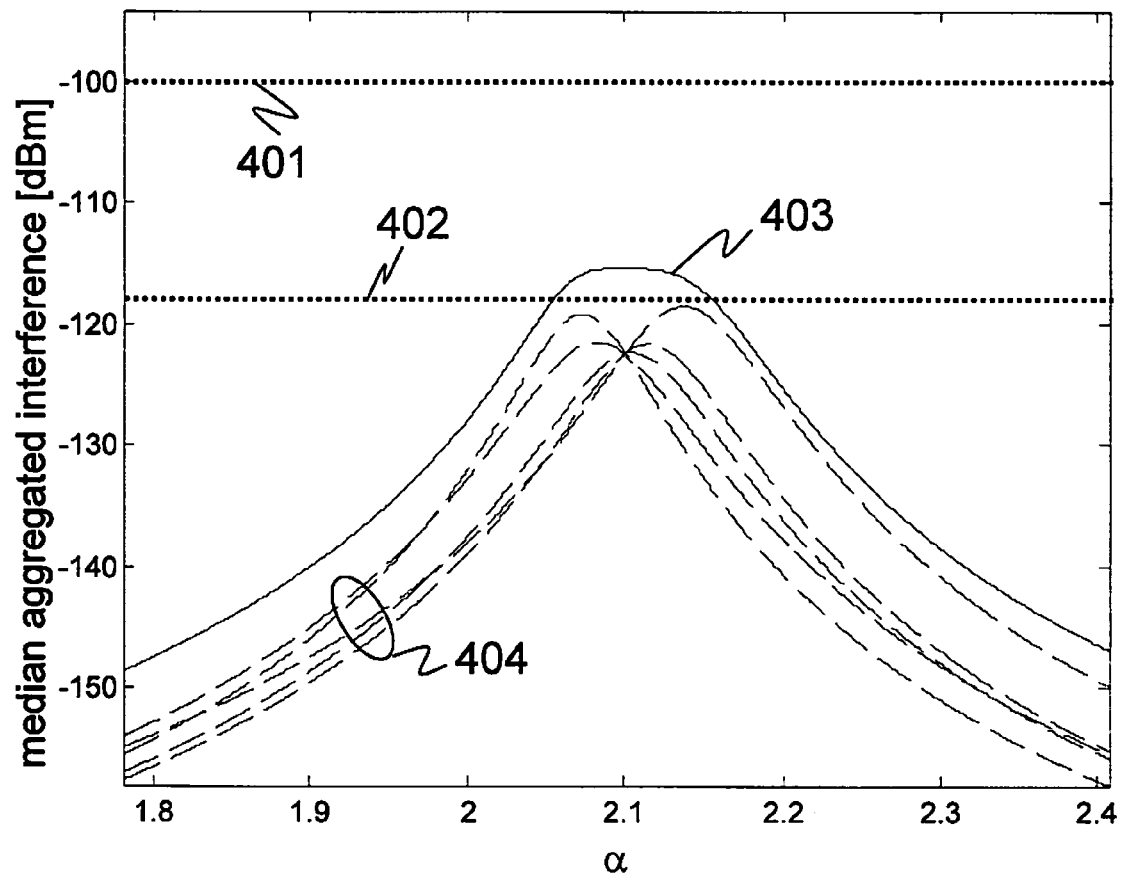
FIG. 4 is a diagram schematically illustrating median values of the aggregated interference along the protection contour.

For this realization, median values, i.e., without fading, of the aggregated interference along the protection contour 403 and also the interference contribution from each of the individual transmitters 404 after optimization are shown in FIG. 4. The top dotted line 401 indicates the threshold $\tau=-100$ dBm for harmful interference and the lower dotted line 402 indicates the threshold for a single interferer with a fading margin included such that the probability of harmful interference becomes exactly $\epsilon=0.5\%$ for the assumed log-normal fading standard deviation $\sigma=7$ dB. Note that each individual interferer needs to keep its power level below the level which it could use if it were the only transmitter present. Also note that the median aggregated interference 403 can exceed the threshold of a single interferer. The reason for this is that the shadow fading variance of the aggregated interference becomes lower than that from a single interferer due to averaging. For this specific realization the FW approximation estimated the probability of harmful interference to 0.499972% and the actual probability of harmful interference obtained from MC simulation was 0.4262%.

Figure 5:
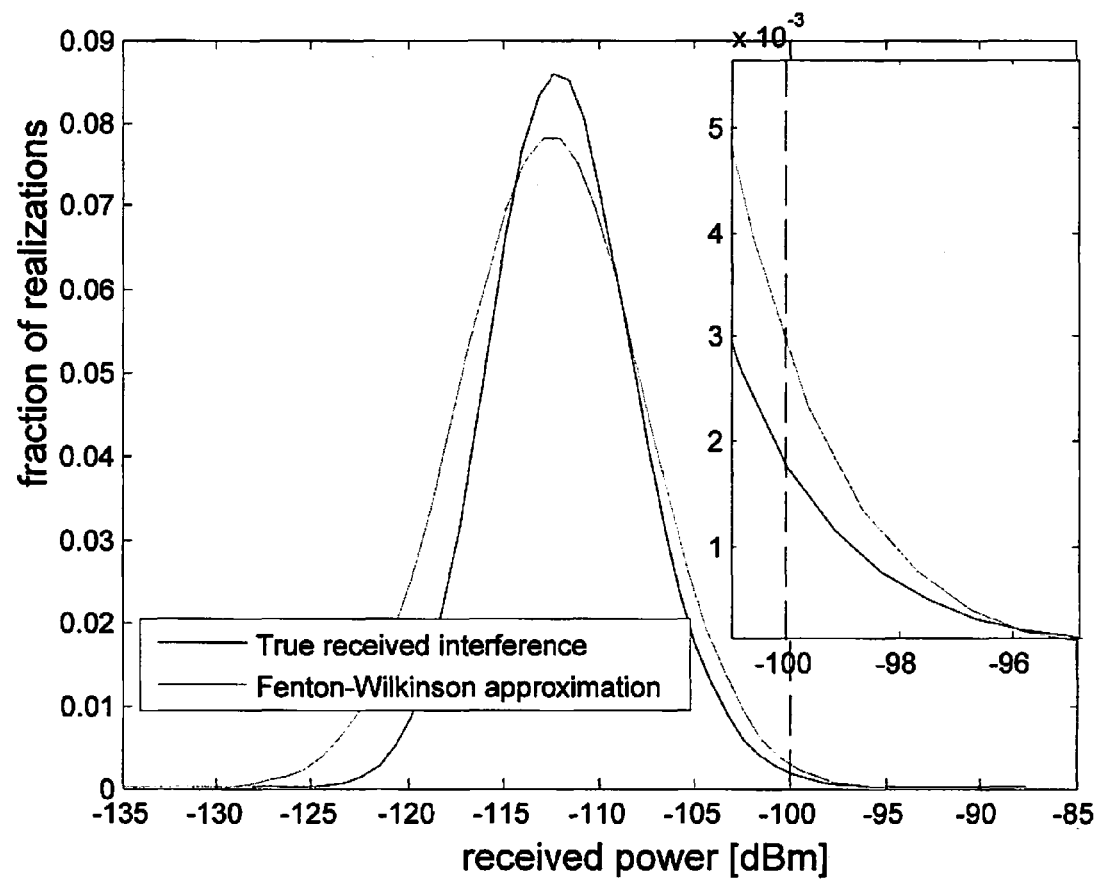
FIG. 5 is a diagram schematically illustrating the received power for a Fenton-Wilkinson (FW) approximation compared to that obtained by a Monte Carlo (MC) simulation.

From the same realization and solution, the distribution based on the random fading of the actual received power obtained by MC simulation and the corresponding FW approximation at the point on the protection contour which is subject to the highest level of median interference is plotted in FIG. 5. As can be seen, the FW approximation is poor for low values of the received power but good for the upper tail of the interference distribution. This is consistent with the findings by others and is a desirable behaviour for the problem at hand.

Finally, some statistical evaluations are shown. One thousand realizations of transmitter positions are generated, the optimization problem in (12) subject to the constraints in (13)-(15) is solved, and each solution is checked by means of MC simulations. The optimization software used (Matlab r2009b) is able to find solutions which very tightly fulfil the probability constraint. This is due to the fact that both the constraint and the objective function do not exhibit many local minima.

Figure 6:
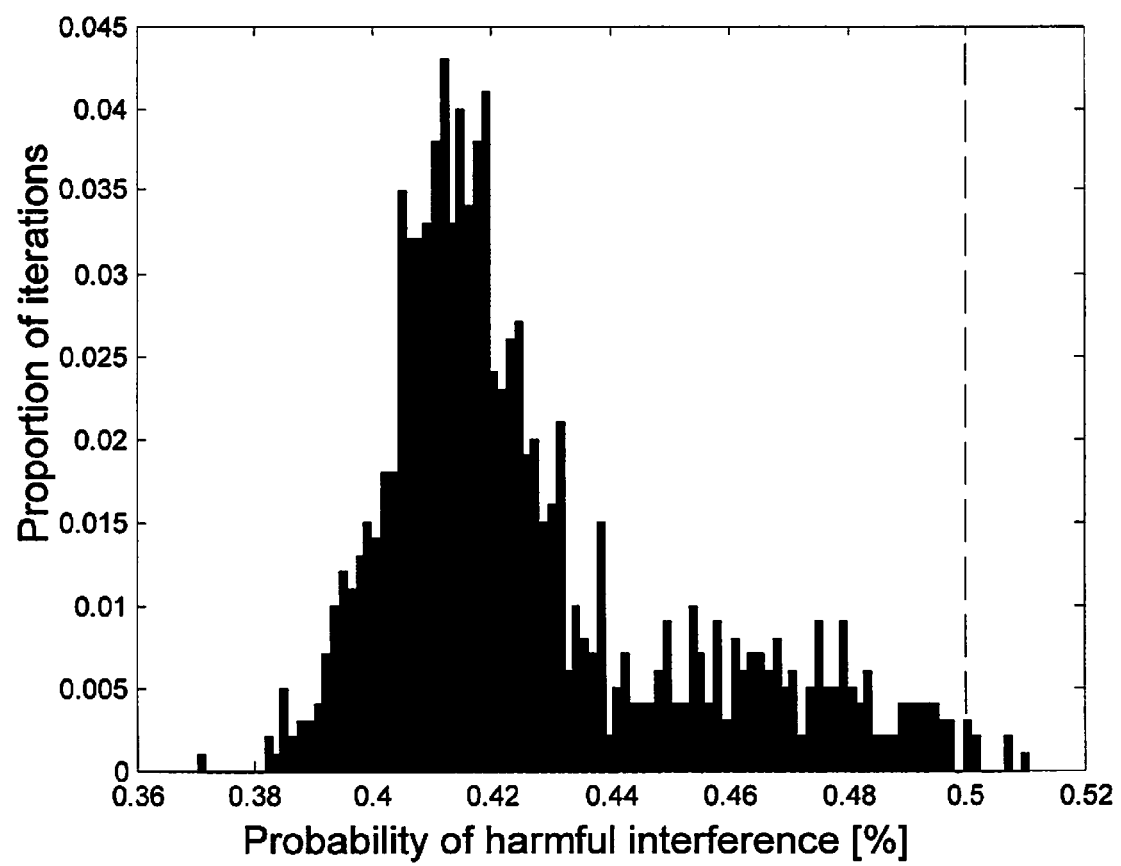
FIGS. 6-7 are histograms illustrating the resulting probabilities of harmful interference for two different fading standard deviations.
Figure 7:
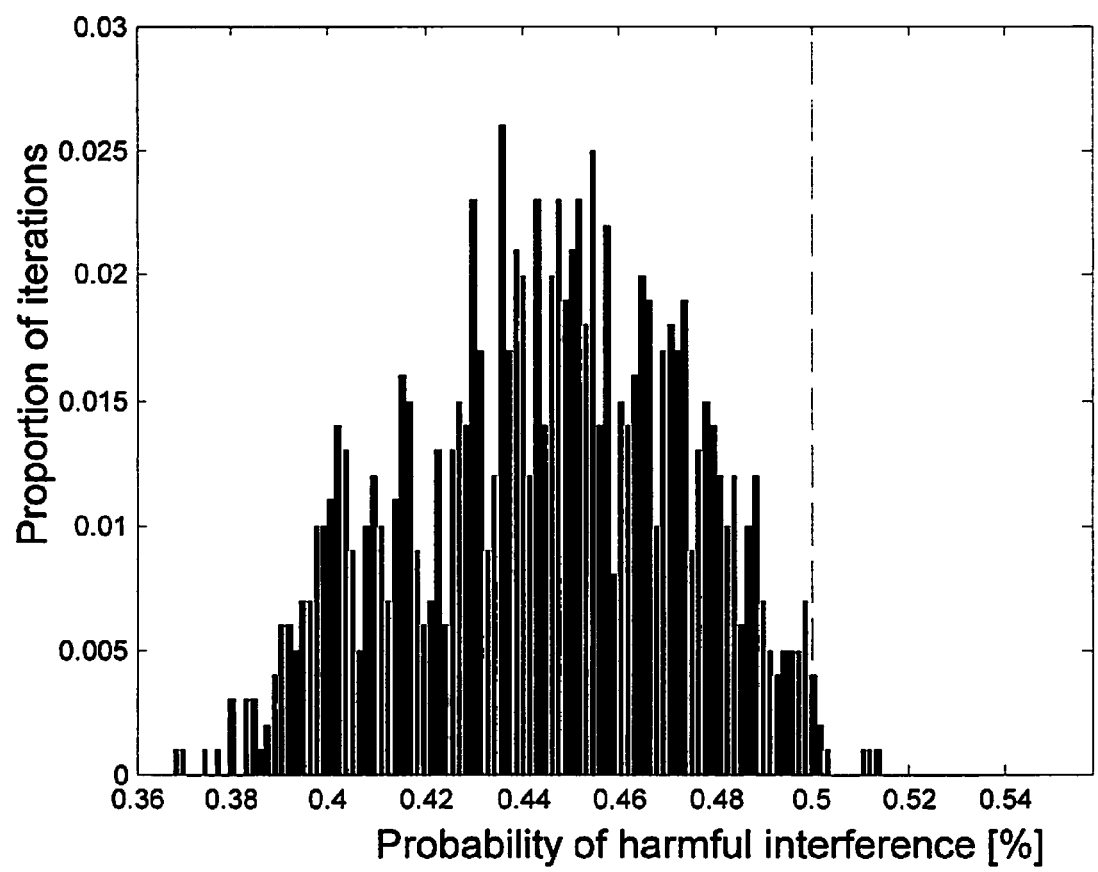

FIG. 6 and FIG. 7 show scaled histograms of the actual probabilities of harmful interference for the solutions to (12), as computed by MC simulation. FIG. 6 shows the histograms for the solutions to the one thousand WSD position realizations for shadow fading standard deviation $\sigma=7$ dB, and FIG. 7 shows the histograms for the solutions to the one thousand WSD position realizations for shadow fading standard deviation $\sigma=12$ dB. It may be noted that in almost all cases the probability of harmful interference is slightly underestimated by the FW approximation, which estimated 0.5%. The underestimation is a good property, as it is better to be slightly conservative in the power limit decision. Furthermore, the probabilities of harmful interference are typically above 0.4%, i.e., close to the desired limit of 0.5%. This means that the performance of the approximation is very good for the studied cases.

The Gradients of the Objective Function and Probability Constraint

Here the expressions of the gradients supplied to the numerical solver of the optimization problem in (12) subject to the constraints in (13)-(15) are derived.

$$\frac{\delta f(p, g, n)}{\delta p_{i,dBm}} = B \frac{10^{(P_{i,dBm}+g_{i,dB}-n_{i,dBm})/10}\ln 10}{10(1 + 10^{(P_{i,dBm}+g_{i,dB}-n_{i,dBm})/10})\ln 2}$$

and since $e^{Z(\alpha,p)}$ is lognormal:

$$Pr(e^{Z(p)} > \tau) = ccdf(\tau, p)$$
$$= \frac{1}{2} - \frac{1}{2}\mathrm{erf}\left[\frac{\ln\tau - m_z(p)}{\sqrt{2\sigma_z^2(p)}}\right]$$

where erf is the error function. The dependency on $\alpha$ is not expressed for notational convenience. Taking the gradient with respect to $p_{dBm}$ gives $$\frac{\partial ccdf(\tau, p)}{\partial p_{dBm}} = \frac{1}{\sqrt{\pi}}$$
$$\exp\left[-\left(\frac{\ln\tau - m_z(p)}{\sqrt{2\sigma_z^2(p)}}\right)^2\right] \cdot \frac{1}{\sqrt{2\sigma_z^2(p)}}\left[\frac{\ln\tau - m_z(p)}{2\sigma_z^2(p)} \cdot \frac{\partial \sigma_z^2(p)}{\partial p_{dBm}} + \frac{\partial m_z(p)}{\partial p_{dBm}}\right]$$

where $$\frac{\delta m_z(p)}{\delta p_{dBm}} = \frac{2}{u_1(p)}\frac{\delta u_1(p)}{\delta p_{dBm}} - \frac{0.5}{u_2(p)}\frac{\delta u_2(p)}{\delta p_{dBm}}$$

and $$\frac{\delta \sigma_z^2(p)}{\delta p_{dBm}} = \frac{1}{u_2(p)}\frac{\delta u_2(p)}{\delta p_{dBm}} - \frac{2}{u_1(p)}\frac{\delta u_1(p)}{\delta p_{dBm}}.$$

There is also $$\frac{\delta u_1(p)}{\delta p_{dBm}} = \begin{bmatrix} \frac{\delta m_{y_1}(p_1)}{\delta p_{1,dBm}}\exp\left[m_{y_1}(p_1) + \frac{\sigma_{y_1}^2}{2}\right] \\ \vdots \\ \frac{\delta m_{y_N}(p_N)}{\delta p_{N,dBm}}\exp\left[m_{y_N}(p_N) + \frac{\sigma_{y_N}^2}{2}\right] \end{bmatrix}$$

-continued where $$\frac{\delta m_{y_i}(p_i)}{\delta p_{i,dBm}} = \frac{\ln 10}{10}$$

and $$\frac{\partial u_2(p)}{\partial p_{dBm}} = \begin{bmatrix} 2\frac{\partial m_{y_1}(p_1)}{\partial p_{1,dBm}}e^{2m_{y_1}(p_1)+2\sigma_{y_1}^2} + \\ 2\sum_{j=2}^{N}\frac{\partial m_{y_1}(p_1)}{\partial p_{1,dBm}}e^{m_{y_1}(p_1)+m_{y_j}(p_j)}\rho_{1\cdot j} \\ 2\frac{\partial m_{y_2}(p_2)}{\partial p_{2,dBm}}e^{2m_{y_2}(p_2)+2\sigma_{y_2}^2} + \\ 2\sum_{j=1\cdot j\neq 2}^{N}\frac{\partial m_{y_2}(p_2)}{\partial p_{2,dBm}}e^{m_{y_2}(p_2)+m_{y_j}(p_j)}\rho_{2\cdot j} \\ \vdots \\ 2\frac{\partial m_{y_N}(p_N)}{\partial p_{N\cdot dBm}}e^{2m_{y_N}(p_N)+2\sigma_{y_N}^2} + \\ 2\sum_{j=1}^{N-1}\frac{\partial m_{y_N}(p_N)}{\partial p_{N\cdot dBm}}e^{m_{y_N}(p_N)+m_{y_j}(p_j)}\rho_{N\cdot j} \end{bmatrix}.$$

By combining the above equations the gradients are readily available.

Method and Node

Figure 8A:
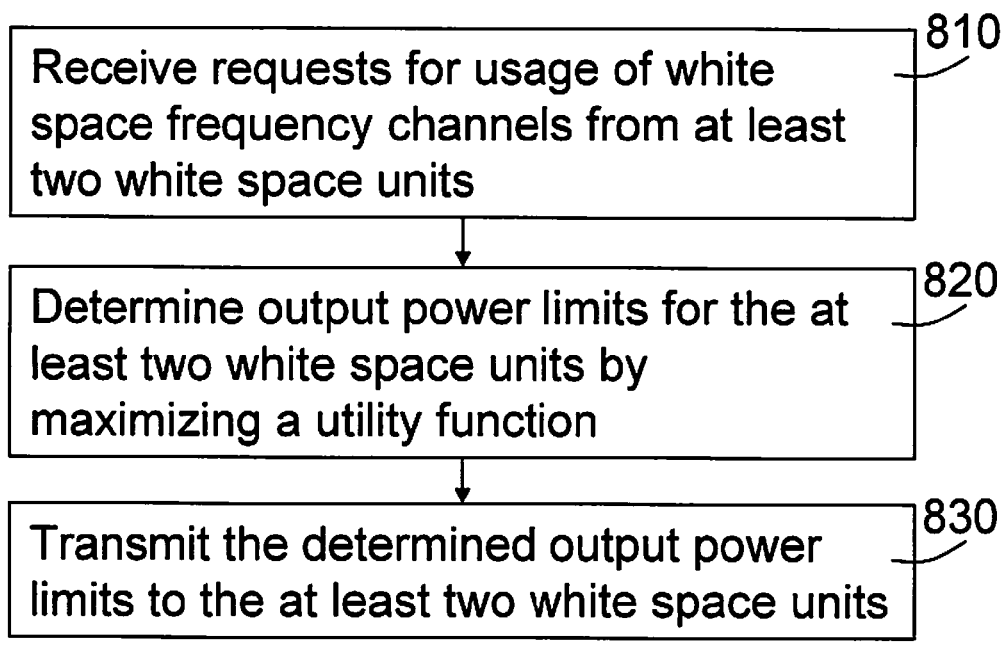
FIGS. 8a and 8b are flowcharts illustrating the method of the node according to embodiments.

FIG. 8a is a flowchart of a method of a node for controlling an aggregated interference generated by at least two white space units in at least one point in space for at least one frequency channel, according to embodiments. The at least one point in space may in embodiments correspond to a point, a line, an area, or a volume. Each of the at least two white space units may be a WSD, or a white space system. In one embodiment the node is a geo-location database. A model of propagation channels from each of the at least two white space units to each of the at least one point comprises a variable with a lognormal distribution. The method comprises:

810: Receiving requests for usage of white space frequency channels from the at least two white space units. The requests comprises positions of the at least two white space units. In one example embodiment, a request for usage of white space frequency channels is received from each one of two WSDs, and each request comprises the position of the requesting WSD. In another example embodiment, a white space system may determine what positions its WSDs have and transmit the positions in the request to the node. Such a position is understood to be information relating to a geographical position of a white space unit. This position may be either a precisely defined point in space, or less specific information including uncertainty. Position uncertainty may be described by defining a probability distribution over a geographical area or volume, e.g., a uniform distribution over a disk as illustrated in FIG. 2, and may be treated by assuming that the position in each case is the worst-case position, i.e., the allowed position closest to the protection contour.

820: Determining output power limits for the at least two white space units by maximizing a utility function while fulfilling a probabilistic constraint on the amount of aggregated interference generated in each of the at least one point, based on the received requests and on said model of propagation channels. A sum of lognormal variables in the probabilistic constraint is approximated by a single lognormal variable. In one embodiment a FW approximation is used for approximating the sum of lognormal variables by a single lognormal variable, as previously described in the section "The approximation" above. The utility function, also called the objective function above, may in embodiments be one of a sum-capacity; a sum-power; or a total throughput of the at least two white space units. The probabilistic constraint may correspond to a probability that each of the at least one points has an aggregated interference which exceeds an interference value threshold, wherein the probability is constrained to be below a probability threshold. In one embodiment, the probabilistic constraint corresponds to the constraint that none of the at least one points have a greater probability than $\epsilon$ of having an aggregated interference which exceeds an interference value threshold $\tau$. $\epsilon$ and $\tau$ may typically be set by a regulator. A probabilistic constraint is given in constraint (3) above.

830: Transmitting the determined output power limits to the respective at least two white space units. In response to the white space units' request for white space channels, the white space units receive output power limits in a reply from the node controlling the interference. The white space units may thus start using the white space that they have been allocated, taking care not to exceed the output power limits that they have received from the node.

Figure 8B:
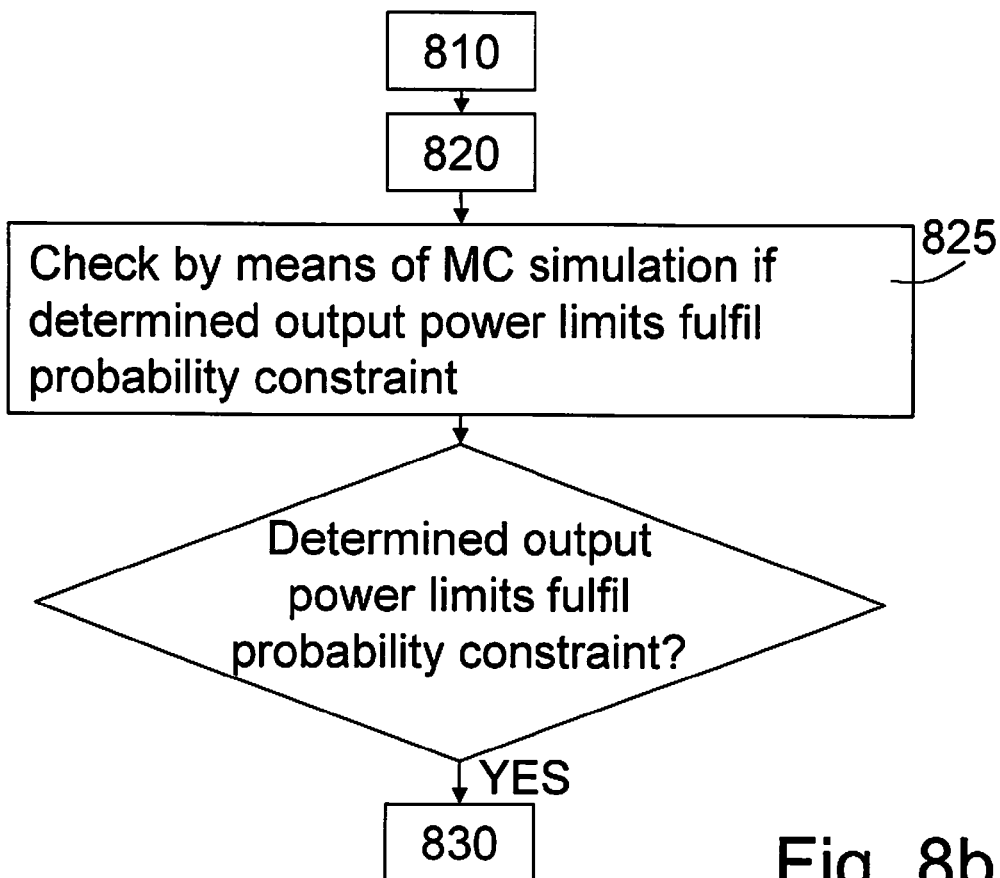

FIG. 8b is a flowchart of the method according to another embodiment, previously described in the section "Solving the optimization problem" above. The method further comprises after steps 810 and 820 described above:

825: Checking by means of an MC simulation if the determined output power limits fulfil the probability constraint.

830: Transmitting the determined output power limits to the respective at least two white space units if the determined output power limits fulfil the probability constraint.

As already mentioned above, the determining of output power limits may in embodiments be subject to additional constraints. In one embodiment, the determining of output power limits is subject to an additional constraint that the determined output power limits must be equal to or lower than a maximum output power value. This constraint corresponds to the constraint in (5) above. The maximum output power value may be received in at least one of the requests. This may e.g. be the case when the white space unit have no use of a power level higher than the maximum output power level, and therefore provides the value in its request. Alternatively it may be pre-defined, or it may be determined based on capabilities of the at least two white space units. In one embodiment, the maximum output power value may be transmitted implicitly by e.g. transmitting an indication of what WSD class that the WSDs belong to, which determines what maximum output power that the WSDs may use.

In a further embodiment the determining of output power limits is subject to an additional constraint that the determined output power limits must be the same for all of the at least two white space units. This constraint corresponds to the power fairness constraint described previously.

In one embodiment, which may be combined with any of the previously described embodiments, the method further comprises comparing one or more of the determined output power limits with a minimum output power value related to a corresponding white space unit. If at least one of the determined output power limits is below the minimum output power value, the method comprises determining the output power limits again with at least one of the at least two white space units removed. The minimum output power value may be received in at least one of the requests. This embodiment is further described in the section "Other extensions" above.

In still another embodiment, further described in the section "Extension to multiple channels" above, the aggregated interference is controlled in at least two frequency channels, and the model of propagation channels for the at least two frequency channels takes adjacent channel suppression into account.

In one embodiment, further described in the section "Extension to include channel selection" above, the maximizing of the utility function comprises a selection of at least one of several frequency channels for each of the at least two white space units. The determining of output power limits may in this first embodiment be subject to at least one of the following constraints: a constraint on a number of simultaneously used frequency channels for the at least two white space units; a constraint on a total transmit power for each of the at least two white space units over all selected frequency channels; a constraint that the at least two white space units must use contiguous frequency channels.

Figure 9A:
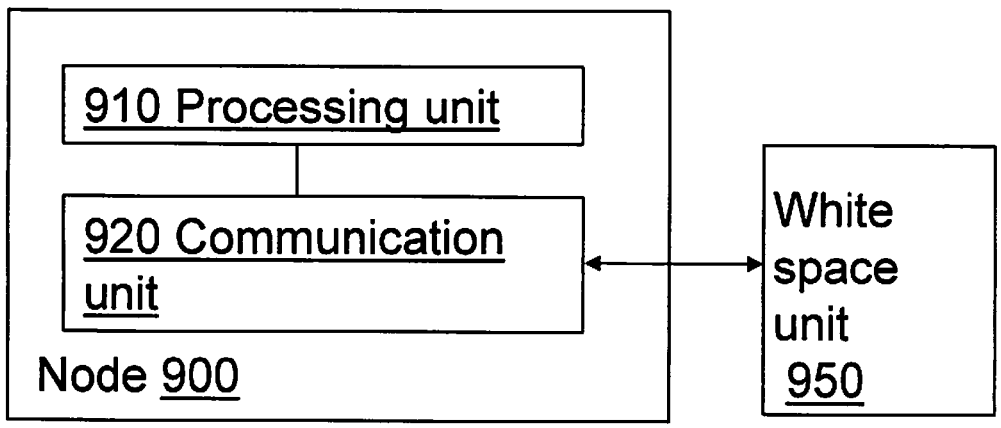
FIGS. 9a-b are block diagrams illustrating the node according to embodiments.

A node 900 and a white space unit 950 are schematically illustrated in FIG. 9a according to embodiments. The node is in one embodiment a geo-location database. The node 900 is configured to control an aggregated interference generated by at least two white space units in at least one point in space for at least one frequency channel. A model of propagation channels from each of the at least two white space units to each of the at least one point comprises a variable with a lognormal distribution. The node comprises a communication unit 920 and a processing unit 910, wherein the communication unit 920 is configured to receive requests for usage of white space frequency channels from the at least two white space units, the requests comprising positions of the at least two white space units. The processing unit 910 is configured to determine output power limits for the at least two white space units by maximizing a utility function while fulfilling a probabilistic constraint on the amount of aggregated interference generated in each of the at least one point, based on the received requests and on said model of propagation channels. A sum of lognormal variables in the probabilistic constraint is approximated by a single lognormal variable. The communication unit 920 is further configured to transmit the determined output power limits to the respective at least two white space units.

In embodiments, the processing unit 910 is further configured to check by means of an MC simulation if the determined output power limits fulfil the probability constraint, and the communication unit 920 is further configured to transmit the determined output power limits to the respective at least two white space units if the determined output power limits fulfil the probability constraint.

In still another embodiment, the processing unit is configured to approximate the sum of lognormal variables by a single lognormal variable by using a FW approximation.

In another embodiment, the processing unit is configured to determine output power limits subject to an additional constraint that the determined output power limits must be equal to or lower than a maximum output power value.

The processing unit may be configured to determine output power limits subject to an additional constraint that the determined output power limits must be the same for all of the at least two white space units.

In one embodiment, the processing unit is further configured to compare at least one of the determined output power limits with a minimum output power value related to a corresponding white space unit, and to determine the output power limits again with at least one of the at least two white space units removed, if the at least one of the determined output power limits is below the minimum output power value. The communicating unit may be configured to receive the minimum output power value in at least one of the requests.

In one embodiment, the maximizing of the utility function comprises a selection of at least one of several frequency channels for each of the at least two white space units. The processing unit may then optionally be configured to determine output power limits subject to at least one of the following constraints: a constraint on a number of simultaneously used frequency channels for the at least two white space units; a constraint on a total transmit power for each of the at least two white space units over all selected frequency channels; a constraint that the at least two white space units must use contiguous frequency channels.

The units described above with reference to FIG. 9a may be logical units or separate physical units, or a combination of both logical and physical units.

Figure 9B:
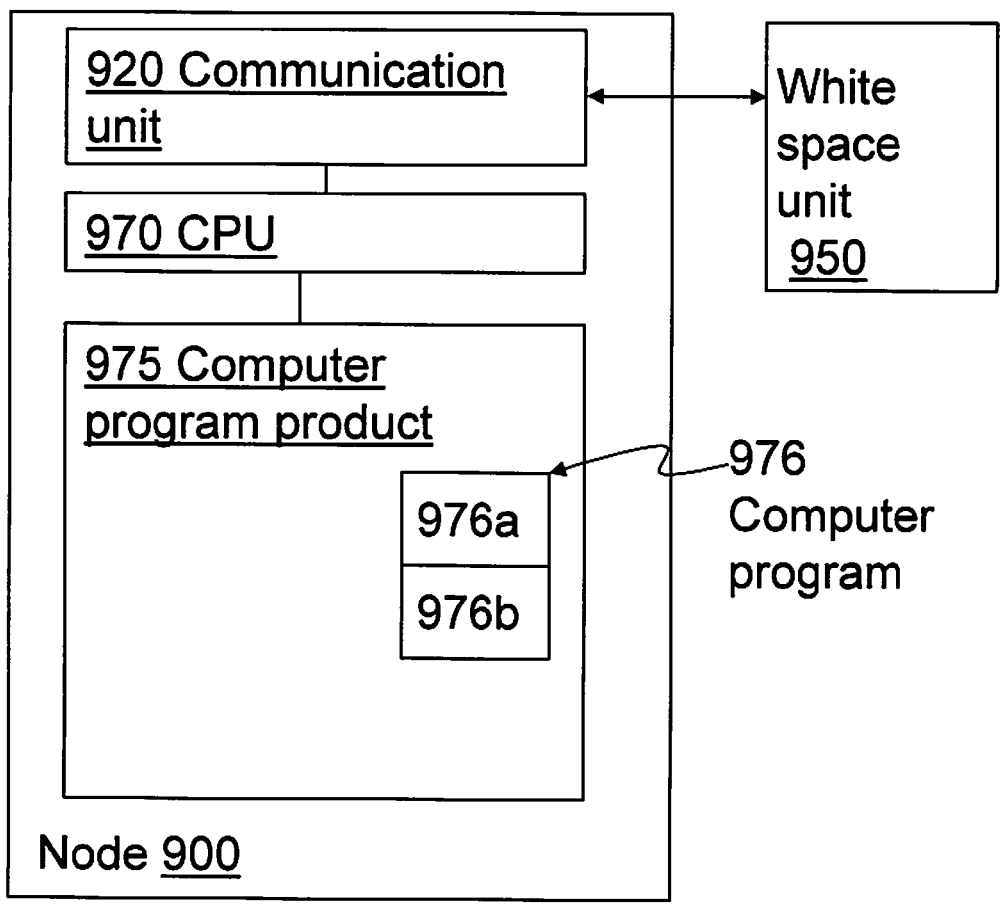

FIG. 9b schematically illustrates an embodiment of the node 900, which is an alternative way of disclosing the embodiment illustrated in FIG. 9a. The node 900 comprises a Central Processing Unit (CPU) 970 which may be a single unit or a plurality of units, and the communication unit 920 already described above. Furthermore, the node 900 comprises at least one computer program product 975 in the form of a non-volatile memory, e.g. an EEPROM (Electrically Erasable Programmable Read-Only Memory), a flash memory or a disk drive. The computer program product 975 comprises a computer program 976, which comprises code means which when run on the node 900 causes the CPU 970 on the node 900 to perform the steps of the method described earlier in conjunction with FIGS. 8a and 8b.

Hence in the embodiments described, the code means in the computer program 976 of the node 900 comprises a module 976a for determining output power limits for the at least two white space units. It also comprises a module 976b for checking by means of an MC simulation if the determined output power limits fulfil the probability constraint. The code means may thus be implemented as computer program code structured in computer program modules. The modules 976a-b essentially perform the steps 820 and 825 of the flow in FIGS. 8a and 8b to emulate the node described in FIG. 9a. In other words, when the different modules 976a-b are run on the CPU 970, they correspond to the unit 910 of FIG. 9a.

Although the code means in the embodiment disclosed above in conjunction with FIG. 9b are implemented as computer program modules which when run on the node 900 causes the node to perform the steps described above in conjunction with FIGS. 8a and 8b, one or more of the code means may in alternative embodiments be implemented at least partly as hardware circuits.

The above mentioned and described embodiments are only given as examples and should not be limiting. Other solutions, uses, objectives, and functions within the scope of the accompanying patent claims may be possible.

The invention claimed is:

1. A method performed by a node, for controlling an aggregated interference generated by at least two white space units in at least one point in space for at least one frequency channel, wherein a model of propagation channels from each of the at least two white space units to each of the at least one point comprises a variable with a lognormal distribution, the method comprising:
   receiving requests for usage of white space frequency channels from the at least two white space units, the requests comprising positions of the at least two white space units,
   determining output power limits for the at least two white space units by maximizing a utility function while fulfilling a probabilistic constraint on the amount of aggregated interference generated in each of the at least one point, based on the received requests and on said model of propagation channels, wherein a sum of lognormal variables in the probabilistic constraint is approximated by a single lognormal variable, the probabilistic constraint corresponding to a probability that the aggregated interference from the at least two white space units does not exceed an interference value threshold, wherein the probability is constrained to be below a probability threshold at each of the at least one points, wherein determining the output power limits further comprises:
      determining that the output power limit for each of the at least two white space units is equal to or lower than a maximum output power value available for the respective one of the at least two white space units;
   transmitting the determined output power limits to the respective at least two white space units, and
   wherein the at least two white space units are requesting simultaneous usage of at least two frequency channels, and
   wherein determining of output power limits is subject to a constraint on a total transmit power for each of the at least two white space units over all selected frequency channels including the at least two frequency channels.

2. The method according to claim 1, further comprising:
   checking by means of a Monte-Carlo, MC, simulation if the determined output power limits fulfil the probability constraint, and
   transmitting the determined output power limits to the respective at least two white space units if the determined output power limits fulfil the probability constraint.

3. The method according to claim 1, wherein the utility function is one of: a sum-capacity; a sum-power; or a total throughput.

4. The method according to claim 1, wherein a Fenton-Wilkinson approximation is used for approximating the sum of lognormal variables by a single lognormal variable.

5. The method according to claim 1, wherein the maximum output power value for the first one of the at least two white space units is received in at least one of the requests, is pre-defined, or is determined based on capabilities of the first one of the at least two white space units.

6. The method according to claim 1, wherein the determining of output power limits is subject to an additional constraint that the determined output power limits must be the same for all of the at least two white space units.

7. The method according to claim 1, further comprising:
   comparing at least one of the determined output power limits with a minimum output power value related to a corresponding white space unit,
   and if the at least one of the determined output power limits is below the minimum output power value:
      determining the output power limits again with at least one of the at least two white space units removed.

8. The method according to claim 7, wherein the minimum output power value is received in at least one of the requests.

9. The method according to claim 1, wherein the aggregated interference is controlled in at least two frequency channels, and wherein the model of propagation channels for the at least two frequency channels takes adjacent channel suppression into account.

10. The method according to claim 1, wherein the maximizing of the utility function comprises a selection of at least one of several frequency channels for each of the at least two white space units.

11. The method according to claim 10, wherein the determining of output power limits is subject to at least one of the following constraints: a constraint on a number of simultaneously used frequency channels for the at least two white space units; and a constraint that the at least two white space units must use contiguous frequency channels.

12. The method according to claim 1, wherein each of the at least two white space units is a white space device, or a white space system.

13. The method according to claim 1, wherein the node is a geo-location database.

14. A node configured to control an aggregated interference generated by at least two white space units in at least one point in space for at least one frequency channel, wherein a model of propagation channels from each of the at least two white space units to each of the at least one point comprises a variable with a lognormal distribution, the node comprising a communication unit and a processing unit, wherein
   the communication unit is configured to receive requests for usage of white space frequency channels from the at least two white space units, the requests comprising positions of the at least two white space units,
   the processing unit is configured to determine output power limits for the at least two white space units by maximizing a utility function while fulfilling a probabilistic constraint on the amount of aggregated interference generated in each of the at least one point, based on the received requests and on said model of propagation channels, wherein a sum of lognormal variables in the probabilistic constraint is approximated by a single lognormal variable, the probabilistic constraint corresponds to a probability that the aggregated interference from the at least two white space units does not exceed an interference value threshold, wherein the probability is constrained to be below a probability threshold at each of the at least one points, wherein when determining the output power limits the process is further operable to:
      determining that the determined output power limit for each of the at least two white space units is equal to or lower than a maximum output power value available for the respective one of the at least two white space units;
   the communication unit is further configured to transmit the determined output power limits to the respective at least two white space units, and wherein the at least two white space units are requesting simultaneous usage of at least two frequency channels, and wherein determining of output power limits is subject to a constraint on a total transmit power for each of the at least two white space units over all selected frequency channels including the at least two frequency channels.

15. The node according to claim 14, wherein the processing unit is further configured to check by means of a Monte-Carlo, MC, simulation if the determined output power limits fulfil the probability constraint, and the communication unit is further configured to transmit the determined output power limits to the respective at least two white space units if the determined output power limits fulfil the probability constraint.

16. The node according to claim 14, wherein the processing unit is configured to approximate the sum of lognormal variables by a single lognormal variable by using a Fenton-Wilkinson approximation.

17. The node according to claim 14, wherein the processing unit is configured to determine output power limits subject to an additional constraint that the determined output power limits must be the same for all of the at least two white space units.

18. The node according to claim 14, wherein the processing unit is further configured to:

compare at least one of the determined output power limits with a minimum output power value related to a corresponding white space unit, and if the at least one of the determined output power limits is below the minimum output power value:

determine the output power limits again with at least one of the at least two white space units removed.

19. The node according to claim 18, wherein the communicating unit is configured to receive the minimum output power value in at least one of the requests.

20. The node according to claim 14, wherein the maximizing of the utility function comprises a selection of at least one of several frequency channels for each of the at least two white space units.

21. The node according to claim 20, wherein the processing unit is configured to determine output power limits subject to at least one of the following constraints: a constraint on a number of simultaneously used frequency channels for the at least two white space units; and a constraint that the at least two white space units must use contiguous frequency channels.

22. The node according to claim 14, wherein the node is a geo-location database.

* * * * *